United States Patent
Bartholomeyczik et al.

(10) Patent No.: US 9,514,780 B2
(45) Date of Patent: Dec. 6, 2016

(54) FREE FALL DETECTION SYSTEM FOR PROTECTING HARD DRIVES IN MOBILE DEVICES

(75) Inventors: Julian Bartholomeyczik, Reutlingen (DE); Sergej Scheiermann, Eningen (DE)

(73) Assignee: Robert Bosch GmbH, Stuttgart (DE)

( * ) Notice: Subject to any disclaimer, the term of this patent is extended or adjusted under 35 U.S.C. 154(b) by 707 days.

(21) Appl. No.: 12/932,635

(22) Filed: Mar. 1, 2011

(65) Prior Publication Data
US 2011/0215940 A1    Sep. 8, 2011

(30) Foreign Application Priority Data
Mar. 8, 2010 (DE) .................. 10 2010 002 656

(51) Int. Cl.
| G08B 21/00 | (2006.01) |
| G11B 19/04 | (2006.01) |
| G01P 15/08 | (2006.01) |
| G01P 15/18 | (2013.01) |

(52) U.S. Cl.
CPC ......... G11B 19/043 (2013.01); G01P 15/0891 (2013.01); G01P 15/18 (2013.01)

(58) Field of Classification Search
None
See application file for complete search history.

(56) References Cited

U.S. PATENT DOCUMENTS

| 5,227,929 | A |   | 7/1993 | Comerford |
| 5,982,573 | A | * | 11/1999 | Henze .............................. 360/75 |
| 7,191,089 | B2 |   | 3/2007 | Clifford et al. |
| 7,324,298 | B2 | * | 1/2008 | Ando ...................... G01P 15/18 360/60 |
| 7,350,394 | B1 | * | 4/2008 | Flynn et al. .................... 73/1.38 |
| 7,395,709 | B2 | * | 7/2008 | Noda et al. ...................... 73/510 |
| 7,450,332 | B2 |   | 11/2008 | Pasolini et al. |
| 7,640,134 | B2 | * | 12/2009 | Park et al. ..................... 702/141 |
| 9,151,777 | B2 | * | 10/2015 | Caritu ................. G01P 15/0891 |
| 2006/0161377 | A1 | * | 7/2006 | Rakkola et al. .............. 702/141 |
| 2007/0030587 | A1 | * | 2/2007 | Noda et al. ..................... 360/75 |
| 2007/0188969 | A1 | * | 8/2007 | Lasalandra et al. .......... 361/160 |
| 2008/0087085 | A1 | * | 4/2008 | Ueda ................... G01P 15/0891 73/514.32 |
| 2009/0006028 | A1 | * | 1/2009 | Sugawara et al. ............ 702/141 |
| 2009/0021858 | A1 | * | 1/2009 | Fu et al. ..................... 360/99.01 |
| 2010/0032332 | A1 | * | 2/2010 | Davis et al. ............... 206/459.1 |

FOREIGN PATENT DOCUMENTS

| CN | 1755373 | 4/2006 |
| CN | 1851474 | 10/2006 |
| CN | 1908675 | 2/2007 |
| CN | 101065674 | 10/2007 |
| TW | 200821581 | 5/2008 |

OTHER PUBLICATIONS

German-English translation for "Betrag," retrieved Jul. 15, 2013 from http://en.bab.la/dictionary/german-english/betrag, pp. 1-2.*
German-English translation for "Absolutetrag," retrieved Jul. 15, 2013 from http://en.bab.la/dictionary/german-english/absolutbetrag, p. 1.*
WolframAlpha; definition of "Absolute Value;" retrieved Apr. 5, 2013; pp. 1-2.*

* cited by examiner

Primary Examiner — Amare Mengistu
Assistant Examiner — Crystal A Mathews
(74) Attorney, Agent, or Firm — Norton Rose Fulbright US LLP; Gerard Messina

(57) ABSTRACT

In a method for detecting free fall, a first acceleration parallel to a first axis, a second acceleration parallel to a second axis perpendicular to the first axis, and a third acceleration parallel to a third axis perpendicular to the first axis and to the second axis are measured. A sum of a first absolute value of the first acceleration, a second absolute value of the second acceleration, and a third absolute value of the third acceleration is calculated, and the free fall is detected as a function of the sum.

12 Claims, 2 Drawing Sheets

FREE FALL DETECTION SYSTEM FOR PROTECTING HARD DRIVES IN MOBILE DEVICES

BACKGROUND OF THE INVENTION

1. Field of the Invention

The present invention is directed to a method and a device for detecting free fall of a mobile device.

2. Description of the Related Art

Such methods and devices are generally known. Portable electronic devices having integrated hard drives are increasingly being offered in the entertainment industry. During use, such devices may be exposed to impacts or drops, which may result in damage to the storage disks and accordingly a loss of data during operation of the hard drive due to the associated movement of the write-read heads. To prevent such damage, it is customary to use triple-axis acceleration sensors which are able to detect impacts and thus offer the possibility of moving the write-read head into a park position in good time. Free fall is detected if an acceleration of near zero is measured on all three axes. If such a case of free fall is detected, it is possible to park the hard drive of the device before impact of the device, i.e., the read head of the hard drive is brought into an area in which it is no longer located above the magnetic disk. Damage to the hard drive caused by the read head may thus be prevented. Roughly three times the mean access time is needed for parking the drive, so that the parking time ranges approximately from 40 to 200 ms.

An acceleration sensor capable of measuring acceleration signals separately on three orthogonal axes (x, y and Z axis) is used for detecting that a device is in free fall. As long as a device is not in motion, the length of the acceleration vector formed from x, y and z is $(v=\text{sqrt}(x^2+y^2+z^2))=1$ g (gravitational acceleration). In free fall, this value is not met and is located in an ideal sensor system, for example, at 0 g in a linear fall movement. The detection of free fall on the basis of a threshold v not being met is described, for example, in U.S. Pat. No. 5,227,929. In this method, it is necessary to calculate sums of squares and form a square root from each of these sums of squares. These numerous calculations are associated with a considerable expense.

Only three individual sensor channels are observed in U.S. Pat. No. 7,191,089 and U.S. Pat. No. 7,450,332. The linking is via AND logic and a check is performed to determine whether all three channels fall short of a threshold. In an ideal sensor, the lowest acceleration value in a channel without free fall and dynamics is equal to $1/\text{sqrt}(3)$.

The disadvantage of the forenamed methods according to the related art is that these methods react sensitively to sensor parameter scattering and to less than ideal sensor characteristics. Furthermore, sensors according to the related art require a comparatively large amount of space and result in comparatively high costs. In addition, it is only possible to implement sensors according to the related art in a microcontroller, making it impossible to have a comparatively simple circuit directly in the sensor.

BRIEF SUMMARY OF THE INVENTION

In contrast to the related art, the method according to the present invention has the advantage that it is possible to achieve comparatively high insensitivity to less than ideal sensor characteristics, a reduced space requirement and cost-effective implementation as a result of simple implementation without multiplication or root extraction operations. These advantages are achieved by measuring a first acceleration parallel to a first axis, a second acceleration parallel to a second axis perpendicular to the first axis and a third acceleration parallel to a third axis perpendicular to the first axis and to the second axis, calculating a sum of a first absolute value of the first acceleration, a second absolute value of the second acceleration and a third absolute value of the third acceleration, and detecting the free fall as a function of the sum.

A mobile device, the free fall of which is to be detected, is represented, for example, by electronic devices such as laptops, MP3 players, PDAs, video cameras, cell phones, etc. All of these devices may contain hard drives which may have a loss of data as a consequence of an impact after a drop due to damage to the storage disk by the write-read head. For that reason, the write-read head is locked, for example, at the edge area of the storage disk when free fall of the device is detected. It is thus possible to prevent a loss of data as a result of the impact.

According to a preferred refinement it is provided that, the first, second, and third accelerations are measured using a triple-axis acceleration sensor. The measurement using a triple-axis acceleration sensor makes it possible to implement the method in a simple manner using known sensor technology. It is furthermore preferred that the triple-axis acceleration sensor forms digital signals. Digital signals make it possible to achieve a comparatively high measuring accuracy so that the method according to the present invention may be implemented to be comparatively insensitive to interference.

According to another preferred refinement, it is provided that the sum is compared to a threshold value. The comparison of the sum with the threshold value is a comparatively simple calculation because it is only necessary to compare two scalar numbers to one another. This simple calculation makes it possible to achieve high insensitivity to less than ideal sensor characteristics, a reduced space requirement, and cost-effective implementation. It is furthermore preferred that a warning signal is generated if the sum falls short of the threshold value. It is possible to generate the warning signal in a simple manner, thus simplifying the implementation of the method. It is furthermore preferred that the warning signal indicates that free fall is present. This simple linking furthermore contributes to making the method simple to implement.

According to another preferred refinement, it is provided that a write-read head of a hard drive is locked if free fall is detected. Locking the write-read head makes it possible to protect the hard drive in the mobile device against damage arising in an impact as a result of the write-read head striking the hard drive. This protection makes it possible to prevent loss of data.

Another object of the present invention is a device for detecting free fall, the device having a triple-axis acceleration sensor and an evaluation circuit, it being possible to detect the free fall as a function of a sum, it being possible to measure a first acceleration parallel to a first axis (X), a second acceleration parallel to a second axis (Y) perpendicular to the first axis (X), and a third acceleration parallel to a third axis (Z) perpendicular to the first axis (X) and to the second axis (Y), it being possible to calculate the sum of a first absolute value of the first acceleration, a second absolute value of the second acceleration and a third absolute value of the third acceleration. In contrast to the related art, the device has the advantage that it is possible to achieve comparatively high insensitivity to less than ideal sensor characteristics, a reduced space requirement and cost-effective implementation as a result of simple implementation without multiplication or root extraction operations.

Starting from the triple-axis acceleration sensor, the detected acceleration signals are recorded in an interim memory (for example, a sample and hold component) in the evaluation circuit. The signals obtained in this manner are, for example, amplified electrically in a preamplifier. In this preamplifier it is additionally possible, for example, to balance the sensitivity and smooth the signals. Furthermore, the absolute values of the acceleration signals are formed. After that, the sum of the absolute values of the acceleration signals is formed. Furthermore, a comparator is used to compare the sum to the threshold value. If the sum is less than the threshold value, it is established that free fall is present. It is furthermore preferred that the device is implemented as a microelectromechanical system (MEMS). It is further preferred that the triple-axis acceleration sensor and the evaluation circuit are integrated in a housing. Preferably, the triple-axis acceleration sensor is situated in the housing on a first substrate and the evaluation circuit is situated on a second substrate. This advantageously makes cost-effective manufacturing possible.

Another object of the present invention is the use of a device for detecting free fall for protecting a mobile device from damage due to an impact after free fall, the device having locking means for locking a write-read head, the free fall being detected as a function of a sum, a first acceleration parallel to a first axis (X), a second acceleration parallel to a second axis (Y) perpendicular to the first axis (X), and a third acceleration parallel to a third axis (Z) perpendicular to the first axis (X) and to the second axis (Y) being measured, the sum of a first absolute value of the first acceleration, a second absolute value of the second acceleration, and a third absolute value of the third acceleration being calculated, a write-read head of the mobile device being locked by the locking means after free fall is detected. In contrast to the related art, the use according to the present invention has the advantage that it is possible to achieve comparatively high insensitivity to less than ideal sensor characteristics, a reduced space requirement and cost-effective implementation as a result of simple implementation without multiplication or root extraction operations.

DETAILED DESCRIPTION OF THE INVENTION

Figure 1:
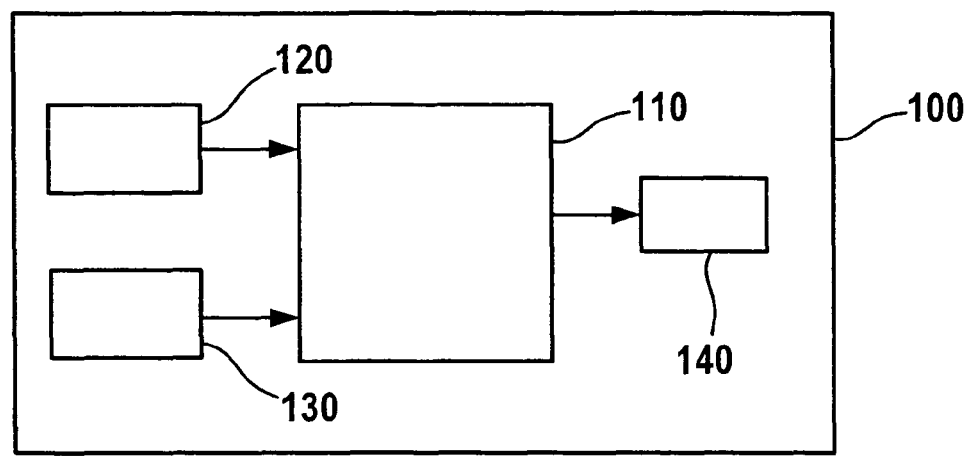
FIG. 1 shows a schematic representation of a mobile device having a device according to the present invention for detecting free fall.

Identical components are consistently provided with the same reference numerals in the various drawings and are therefore usually named or mentioned only once.

A mobile device 100 having a device according to the present invention for detecting free fall is represented schematically in FIG. 1. The mobile device may be, for example, a laptop, an MP3 player, a PDA, a cell phone or another electronic device which may exhibit damage due to impact after a drop. Hard drives in particular in the forenamed devices are at risk for damage in the case of a drop, since it is possible for the write-read head to contact the storage disks as a result of the impact and may possibly be irreparably damaged. Such damage may result in a loss of data or impairment of the hard drive or the device. To prevent damage, it is therefore provided to read the measuring signals of triple-axis acceleration sensor 120 into a control unit 110 in order to prevent free fall and accordingly impending impact. If control unit 110 detects free fall, it initiates a measure that locks the write-read head of hard drive 140, for example, by running it to the edge of the disk storage and locking it there. It is alternatively possible for the signal of triple-axis acceleration sensor 120 to be read into a separate evaluation circuit 130 for detecting free fall. Such an evaluation circuit 130 makes it possible for control unit 110 to be informed only if free fall is detected. This reduces the computational complexity within control unit 110.

Figure 2:
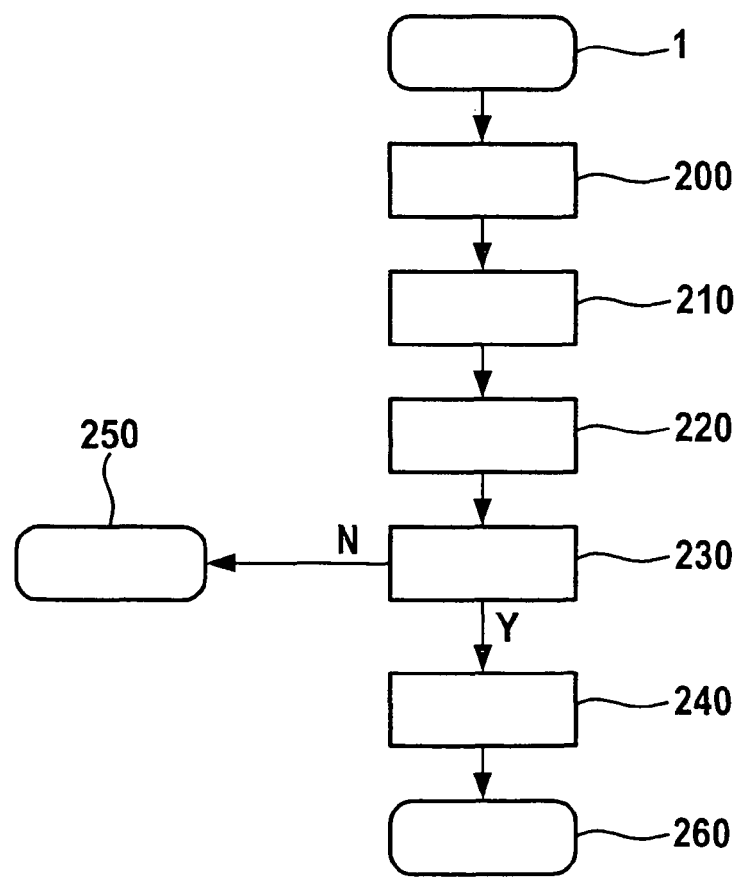
FIG. 2 shows a flow chart for detecting free fall according to the present invention as a function of the detection of acceleration variables according to a first specific embodiment.

An algorithm which represents the method according to the present invention for detecting free fall according to a first specific embodiment is described in FIG. 2. Corresponding programs run, for example, in control unit 110. After start 1, the acceleration signals of the triple-axis acceleration sensor are determined in step 200. The absolute values of the acceleration signals are formed in step 210. In step 220, the individual absolute values of the acceleration signals are added together to form one sum. In step 230, the sum of the individual absolute values of the acceleration signals is compared to a threshold value. If the sum is not less than the threshold, i.e., if the sum is greater than or equal to the threshold value, the program is ended in block 250. If the sum is less than the threshold value, the information is provided in step 240 that free fall is present. This information is provided, for example, via an interrupt. The program ends in block 260.

Figure 3:
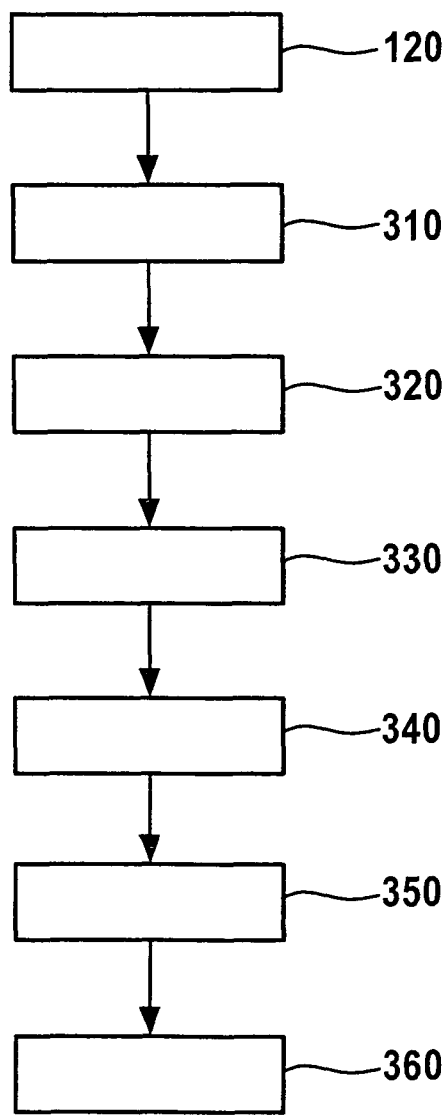
FIG. 3 shows a flow chart for detecting free fall according to the present invention as a function of the detection of the acceleration variables according to a second specific embodiment.

Alternatively, the detection of free fall may be implemented in a separate evaluation circuit. Such an evaluation circuit will be described with reference to a second specific embodiment in FIG. 3. Starting from a triple-axis acceleration sensor 120, the detected acceleration signals are recorded in an interim memory 310 (for example, a sample & hold component). The signals obtained in this manner are, for example, amplified electrically in a preamplifier 320. In this preamplifier 320, it is additionally possible, for example, to balance the sensitivity and smooth the signals. The absolute values of the acceleration signals are formed in block 330. In block 340, the sum of the absolute values of the acceleration signals is formed. In block 350, a comparator is used to compare the sum to the threshold value. If the sum is less than the threshold value, it is established in block 360 that free fall is present.

Triple-axis acceleration sensor 120 may be integrated in the housing of device 100. It is alternatively possible to integrate triple-axis acceleration sensor 120 in a component of device 100. In the simplest case, triple-axis acceleration sensor 120 only requires a power supply and contains a digital output for signal evaluation. In order to save power in battery-operated devices 100, it is possible to clock the power supply of triple-axis acceleration sensor 120, the signals for evaluation being stored in a retention component (sample & hold). It is alternatively possible to evaluate the signals digitally using an A/D converter.

What is claimed is:

1. A method for detecting a free fall of a mobile device, comprising:
recording a first acceleration of the mobile device provided by a first acceleration sensor, the first acceleration being parallel to a first axis;
recording a second acceleration of the mobile device provided by a second acceleration sensor, the second acceleration being parallel to a second axis perpendicular to the first axis;
recording a third acceleration of the mobile device provided by a third acceleration sensor, the third acceleration being parallel to a third axis perpendicular to the first axis and to the second axis;
determining first, second and third absolute values of the first, second and third accelerations, respectively;
determining a sum of the first, second and third absolute values;
detecting the free fall of the mobile device solely as a function of the sum; and
generating a warning signal responsive to detecting the free fall.

2. The method as recited in claim 1, wherein the first acceleration, the second acceleration, and the third acceleration are recorded from a triple-axis acceleration sensor.

3. The method as recited in claim 2, wherein the triple-axis acceleration sensor is configured to generate digital signals.

4. The method as recited in claim 1, further comprising:
comparing the sum to a predetermined threshold value.

5. The method as recited in claim 4, further comprising:
generating the warning signal if the sum is below the threshold value.

6. The method as recited in claim 5, wherein the warning signal indicates that the free fall is present.

7. The method as recited in claim 6, further comprising:
locking a write-read head of a hard drive of the mobile device if the free fall is detected.

8. A device for detecting a free fall of a mobile device, comprising:
a triple-axis acceleration sensor configured to generate:
a first acceleration of the mobile device parallel to a first axis,
a second acceleration of the mobile device parallel to a second axis perpendicular to the first axis, and
a third acceleration of the mobile device parallel to a third axis perpendicular to the first axis and to the second axis; and
an evaluation circuit configured to:
record the generated first, second and third accelerations,
determine first, second and third absolute values of the first, second and third accelerations, respectively,
determine a sum of the first, second and third absolute values, and
detect the free fall of the mobile device solely as a function of the sum.

9. The device as recited in claim 8, wherein the device is implemented as a microelectromechanical system.

10. The device as recited in claim 9, wherein the triple-axis acceleration sensor and the evaluation circuit are integrated in a sensor housing.

11. The device as recited in claim 8, further comprising:
a lock for locking a write-read head of a hard drive of the mobile device if the free fall is detected.

12. The method of claim 1, wherein the first, the second, and the third acceleration sensors are part of a single triple axis acceleration sensor.

* * * * *